(12) United States Patent
Sun et al.

(10) Patent No.: US 9,960,420 B2
(45) Date of Patent: May 1, 2018

(54) LITHIUM-SULFUR BATTERY CATHODE MATERIAL AND METHOD FOR MAKING THE SAME

(71) Applicants: Tsinghua University, Beijing (CN); HON HAI PRECISION INDUSTRY CO., LTD., New Taipei (TW)

(72) Inventors: Li Sun, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 311 days.

(21) Appl. No.: 14/722,112

(22) Filed: May 26, 2015

(65) Prior Publication Data

US 2015/0357634 A1 Dec. 10, 2015

(30) Foreign Application Priority Data

Jun. 4, 2014 (CN) .......................... 2014 1 0243939

(51) Int. Cl.
*H01M 4/136* (2010.01)
*H01M 4/38* (2006.01)
(Continued)

(52) U.S. Cl.
CPC ........... *H01M 4/366* (2013.01); *H01M 4/133* (2013.01); *H01M 4/136* (2013.01); *H01M 4/38* (2013.01); *H01M 4/581* (2013.01); *H01M 4/587* (2013.01); *H01M 4/625* (2013.01); *H01M 4/043* (2013.01); *H01M 10/052* (2013.01); *H01M 2004/028* (2013.01)

(58) Field of Classification Search
None
See application file for complete search history.

(56) References Cited

U.S. PATENT DOCUMENTS

2004/0058246 A1 3/2004 Choi et al.
2006/0177659 A1* 8/2006 Chen .................... B01D 53/02
428/403

(Continued)

FOREIGN PATENT DOCUMENTS

| CN | 1485941 | | 3/2004 |
| CN | 101577323 A | * | 11/2009 |
| CN | 103500819 | | 1/2014 |

OTHER PUBLICATIONS

Yinglei et al. CN 101577323 A, machnie translation.*

(Continued)

*Primary Examiner* — Wojciech Haske
(74) *Attorney, Agent, or Firm* — ScienBiziP, P.C.

(57) ABSTRACT

A method for making a lithium-sulfur battery cathode material includes steps of providing a carbon nanotube source; providing sulfur and a first solvent; adding the carbon nanotube source and the sulfur into the first solvent, and ultrasonically agitating the first solvent to form a first suspension. A second solvent is added during an agitation process to form a second suspension and the first solvent and the second solvent are removed from the second suspension. The present disclosure also relates to a lithium-sulfur battery cathode material obtained by the method.

12 Claims, 9 Drawing Sheets

(51) Int. Cl.

| | | |
|---|---|---|
| *H01M 4/36* | (2006.01) | |
| *H01M 4/133* | (2010.01) | |
| *H01M 4/58* | (2010.01) | |
| *H01M 4/587* | (2010.01) | |
| *H01M 4/62* | (2006.01) | |
| *H01M 4/02* | (2006.01) | |
| *H01M 4/04* | (2006.01) | |
| *H01M 10/052* | (2010.01) | |

(56) References Cited

U.S. PATENT DOCUMENTS

2008/0241695 A1* 10/2008 Song ............ B82Y 30/00
                                                    429/231.8
2013/0164626 A1*  6/2013 Manthiram ........ B82Y 30/00
                                                    429/231.8

OTHER PUBLICATIONS

"Sulfur Nanocrystals Confined in Carbon Nanotube Network As a Binder-Free Electrode for High-Performance Lithium Sulfur Batteries", LiSun, et al., Nano Letters, Jun. 2, 2014, 4044-4049, vol. 14, No. 7.

* cited by examiner

LITHIUM-SULFUR BATTERY CATHODE MATERIAL AND METHOD FOR MAKING THE SAME

CROSS-REFERENCE TO RELATED APPLICATIONS

This application claims all benefits accruing under 35 U.S.C. §119 from China Patent Application No. 201410243939.0, field on Jun. 4, 2014 in the China Intellectual Property Office, disclosure of which is incorporated herein by reference.

FIELD

The disclosure generally relates to battery manufacture.

BACKGROUND

A lithium-sulfur battery cathode is sulfur, and a lithium-sulfur battery anode is elemental lithium. During electrical discharge process, the elemental lithium loses electrons to become lithium-ion, the sulfur reacts with the lithium-ion and the electrons to produce sulfides. A reaction equation is expressed as follows: $S_8+16Li^++16e^{-1}=8Li_2S$. A lithium-sulfur battery has advantages of low-cost, environmental friendliness, good safety, and high theoretical specific capacity.

However, since sulfur is electrically insulated, during charge and discharge processes, a volume of the sulfur will shrink or swell. In addition, the intermediate products of the sulfur formed in the discharge process, such as $Li_2S_n$, n=4~8, will be dissolved in an electrolyte, losing the sulfur, and a "shuttle effect" will occur between two electrodes. Thus the specific capacity and cycling stability of the lithium-sulfur battery will be limited.

BRIEF DESCRIPTION OF THE DRAWINGS

Implementations of the present technology will now be described, by way of example only, with reference to the attached figures.

DETAILED DESCRIPTION

Figure 1:
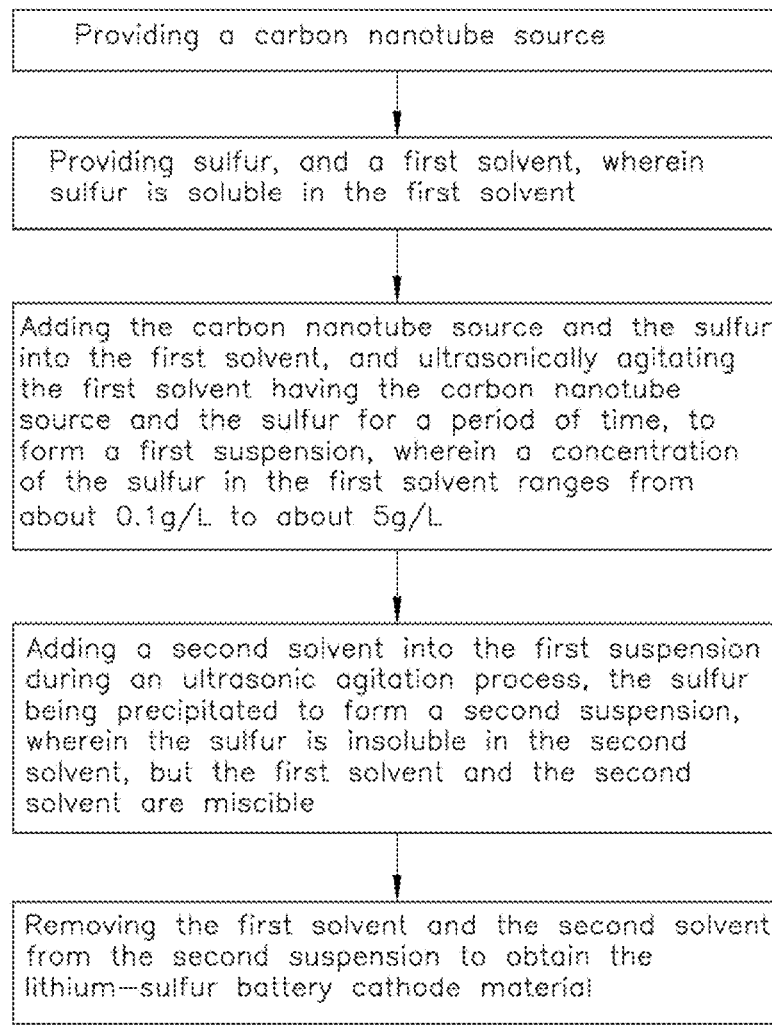
FIG. 1 is a flow chart of one embodiment of a process for making a lithium-sulfur battery cathode material.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The term "comprising," when utilized, means "including, but not necessarily limited to"; it specifically indicates open-ended inclusion or membership in the so-described combination, group, series and the like.

FIG. 1 illustrates one embodiment of a method for making a lithium-sulfur battery cathode material, which includes the following steps:

S1: providing a carbon nanotube source;

S2: providing sulfur, and a first solvent, wherein sulfur is soluble in the first solvent;

S3: adding the carbon nanotube source and the sulfur into the first solvent, and ultrasonically agitating the first solvent having the carbon nanotube source and the sulfur for a period of time, to form a first suspension, wherein a concentration of the sulfur in the first solvent ranges from about 0.1 g/L to about 5 g/L;

S4: adding a second solvent into the first suspension during an ultrasonic agitation process, the sulfur being precipitated to form a second suspension, wherein the sulfur is insoluble in the second solvent, but the first solvent and the second solvent are miscible; and S5: removing the first solvent and the second solvent from the second suspension to obtain the lithium-sulfur battery cathode material.

In step S1, the carbon nanotube source can be made of carbon nanotubes. The carbon nanotubes can be single-walled carbon nanotubes, double-walled carbon nanotubes, or multi-walled carbon nanotubes. A diameter of the carbon nanotube can be in a range from about 20 nanometers to about 30 nanometers. A length of the carbon nanotubes can be longer than 100 micrometers. In one embodiment, the length of the carbon nanotubes is longer than 300 micrometers. The carbon nanotubes can be pure, meaning there are few or no impurities adhered on surface of the carbon nanotubes. A method for making the carbon nanotube source can include providing a carbon nanotube array, wherein the carbon nanotube array can be formed on a substrate, and scratching off the carbon nanotube array from the substrate to form the carbon nanotube source. In one embodiment, the carbon nanotube array is a super aligned carbon nanotube array. In the super aligned carbon nanotube array, a length of the carbon nanotubes is virtually uniform and longer than 300 micrometers. Surfaces of the carbon nanotubes are clean and without impurities. Since an attractive force between the individual carbon nanotubes of the carbon nanotube array is large, the lithium-sulfur battery cathode material is stronger; and the carbon nanotube source scratched from the carbon nanotube array can maintain a clustered structure, and the carbon nanotubes will not separate from each other.

In step S2, the first solvent can be methanol, ethanol, acetone, or the like.

In step S3, since the sulfur can be soluble in the first solvent, and the carbon nanotube source is insoluble in the first solvent; the suspended matter of the first suspension only includes the carbon nanotubes. In one embodiment, the concentration of the sulfur in the first solvent ranges from about 0.5 g/L to about 2 g/L. If the concentration of the sulfur is too small, a precipitation quantity of sulfur nano-crystals in subsequent steps will be small, and an efficiency of the lithium-sulfur battery will be low. If the concentration of the sulfur is too large, the sulfur nano-crystals precipitated in subsequent steps will reunite together, which is not conducive to producing the sulfur nano-crystals.

An order of adding the carbon nanotube source and the sulfur into the first solvent is not important. In one embodiment, the carbon nanotube source is added into the first solvent first, and then the sulfur is added. In another embodiment, the sulfur is added into the first solvent first, and then the carbon nanotube source is added. In still another embodiment, the carbon nanotube source and the sulfur are added into the first solvent at the same time.

A mass ratio of the sulfur and the carbon nanotube source can be in a range from about 0.5:1 to about 2:1. The mass ratio range can improve a specific capacity of the lithium-sulfur battery cathode material. The mass ratio range can also form more sulfur nano-crystals in subsequent steps, and such sulfur nano-crystals will not reunite together. In one embodiment, the mass ratio of the sulfur and the carbon nanotube source is in a range from about 1:1 to about 1.5:1.

During a process of ultrasonically agitating the first solvent having the carbon nanotube source and the sulfur, a power of ultrasonic waves can be in a range from about 800 W to about 1500 W. In some embodiments, the power is in a range from about 1000 W to about 1200 W. A duration of the process of ultrasonically agitating of the first solvent having the carbon nanotube source and the sulfur can range from about 10 minutes to about 60 minutes. After the first solvent having the carbon nanotube source and the sulfur is dispersed, the sulfur is sufficiently dissolved in the first solvent; and the carbon nanotubes of the carbon nanotube source can be uniformly distributed in the first solvent, to form a net structure. Since the power of the ultrasonic waves can be in a range from about 800 W to about 1500 W, a volume of the net structure is larger than 100 times of a volume of the carbon nanotube source. The carbon nanotubes of the net structure are entangled with each other to form a plurality of pores after removing the solvent. A diameter of each pore in the plurality of pores is in a range from about 20 nanometers to about 10 nanometers.

In step S4, since the sulfur is precipitated from the first solvent, suspended matter of the second suspension includes uniformly dispersed carbon nanotubes and sulfur nano-crystals uniformly coated on the surface of carbon nanotubes. In one embodiment, the second solvent is dripped slowly into the first suspension, to avoid a rapid precipitation of the sulfur, and obtain the nanoscale sulfur nano-crystals. A dripping rate ranges from about 0.5 mL/min to about 2 mL/min. A volume ratio of the first solvent and the second solvent is in a range from about 1:1 to about 3:1. The second solvent can be water.

In step S5, the first solvent and the second solvent can be removed from the second suspension via an air pump filtration method or a drying method.

The lithium-sulfur battery cathode material is a structure which is self-supporting, and the structure can be cut directly to form a lithium-sulfur battery cathode.

In other embodiments, the lithium-sulfur battery cathode material can be pressed to form a lithium-sulfur battery cathode of various shapes. A size of the lithium-sulfur battery cathode can be selected according to actual need.

Figure 2:
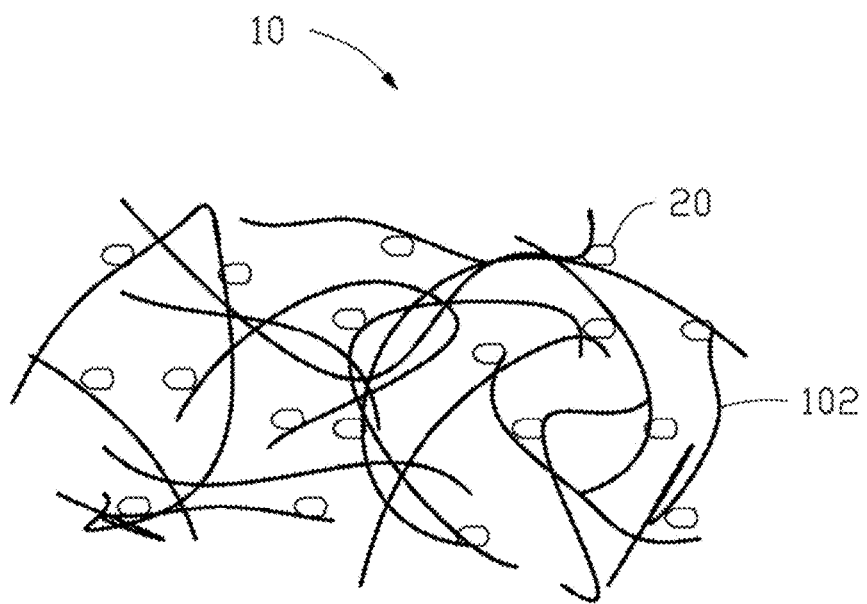
FIG. 2 is a structural schematic view of one embodiment of a lithium-sulfur battery cathode material.

FIG. 2 illustrates one embodiment of a lithium-sulfur battery cathode material. The lithium-sulfur battery cathode material can be a three-dimensional net structure having a plurality of pores. The plurality of pores is uniformly distributed on a surface and interior of the three-dimensional net structure. An inner diameter of each pore of the plurality of pores ranges from about 20 nanometers to about 10 micrometers. In one embodiment, the inner diameter of each pore of the plurality of pores ranges from about 100 nanometers to about 500 nanometers. When the inner diameter is too small, the electrolyte does not enter the lithium-sulfur battery cathode material. If the inner diameter is too large, the reactive substances are easily lost. The lithium-sulfur battery cathode material includes a carbon nanotube net structure 10 and a plurality of sulfur nano-crystals 20 uniformly adsorbed on the carbon nanotube net structure 10. In another embodiment, the lithium-sulfur battery cathode material consists of a carbon nanotube net structure 10 and a plurality of sulfur nano-crystals 20 uniformly coated on the carbon nanotube net structure 10. A mass ratio of the plurality of sulfur nano-crystals 20 and the carbon nanotube net structure 10 can range from about 0.5:1 to about 2:1. In another embodiment, the mass ratio of the plurality of sulfur nano-crystals 20 and the carbon nanotube net structure 10 can range from about 1:1 to about 1.5:1.

A specific surface area of the carbon nanotube net structure 10 is larger than 200 $m^2/g$. The carbon nanotube net structure 10 includes a plurality of carbon nanotubes 102 entangled with each other, giving excellent mechanical properties to the carbon nanotube net structure 10, thus the lithium-sulfur battery cathode material has excellent mechanical properties without adhesive. Adjacent carbon nanotubes 102 are entangled with each other, thereby forming a plurality of pores in the carbon nanotube net structure 10.

The plurality of sulfur nano-crystals 20 is attached on a surface of the carbon nanotubes 102 by van der Waals attractive force or wrapped and enclosed by the carbon nanotubes 102. The plurality of sulfur nano-crystals 20 can be wrapped and fixed by the carbon nanotube net structure 10 due to the plurality of pores, the carbon nanotubes 102 function as electrical conductors, and also function as an adhesive to bond the plurality of sulfur nano-crystals 20. A diameter of the plurality of sulfur nano-crystals 20 is in a range from about 10 nanometers to about 30 nanometers.

Example 1

Providing a carbon nanotube array, a diameter of the carbon nanotubes in the carbon nanotube array is about 20 nanometers, and a length of the carbon nanotubes in the carbon nanotube array is about 300 micrometers. Adding about 15 mg sulfur powder into about 40 mL ethanol, a diameter of the particles of sulfur powder is about 50 micrometers; and dispersing the particles in ethanol with 1000 W ultrasonic waves for about 10 minutes. Scratching off about 15 mg carbon nanotube array and adding it into the ethanol; and agitating the ethanol with 1000 W ultrasonic waves for about 30 minutes. During an ultrasonically agitating process, dripping about 20 mL deionized water into the ethanol via a pipe, to precipitate the sulfur. Removing the ethanol and the deionized water to form the lithium-sulfur battery cathode material.

Comparative Example 1

In this example, a lithium-sulfur battery cathode material is prepared in the same method as in Example 1, except that about 24 mg sulfur powder and about 6 mg carbon nanotube array are added into the ethanol. The mass ratio of the sulfur powder and the carbon nanotube source is about 4:1.

Comparative Example 2

Mixing sulfur powder, carbon black and PVDF at a mass ratio of 50:40:10 to form a slurry; coating the slurry on aluminum foil to form a traditional lithium-sulfur battery cathode.

Figure 3:
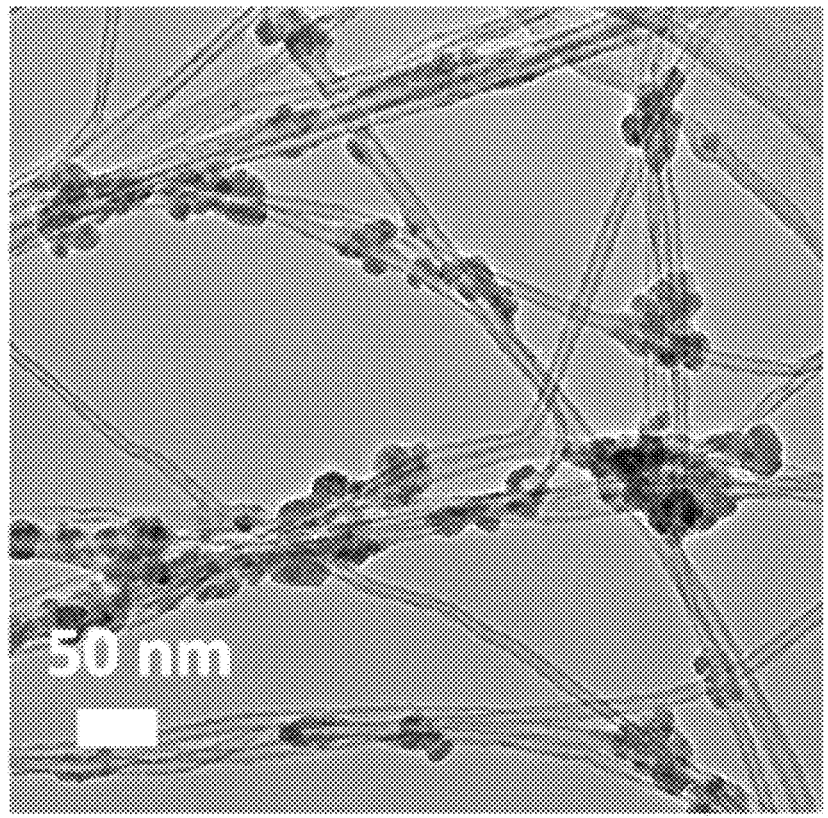
FIG. 3 shows a Transmission Electron Microscope image (TEM) of Example 1 of a lithium-sulfur battery cathode material.

FIG. 3 illustrates a TEM image of Example 1 of the lithium-sulfur battery cathode material. FIG. 3 shows that the sulfur nano-crystals are nanoscale in size, and the sulfur nano-crystals are distributed uniformly.

Figure 4:
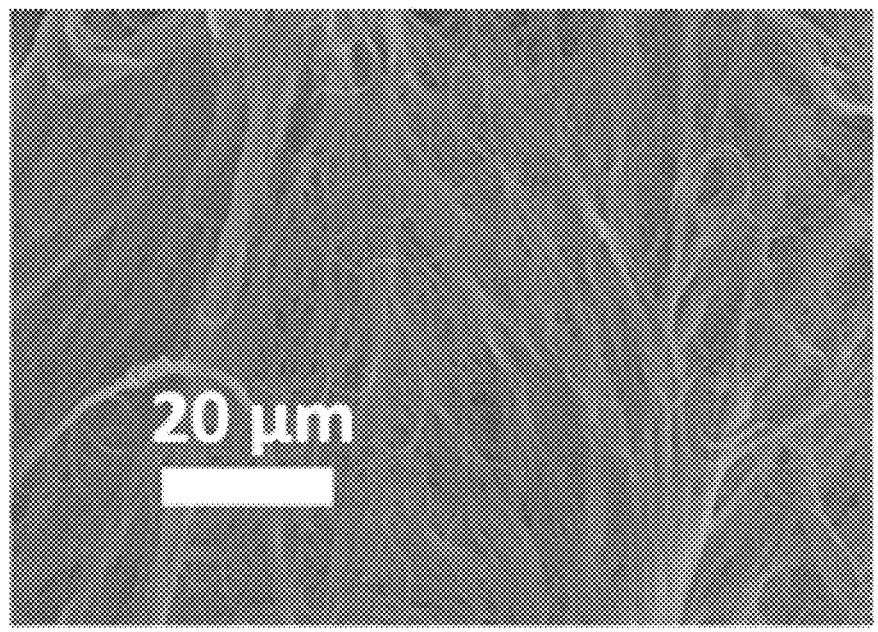
FIG. 4 shows a Scanning Electron Microscope image (SEM) of Example 1 of a lithium-sulfur battery cathode material.

FIG. 4 illustrates an SEM image of Example 1 of the lithium-sulfur battery cathode material. FIG. 4 shows that there are no overlarge sulfur particles or sulfur crystal clusters in the lithium-sulfur battery cathode material.

Figure 5:
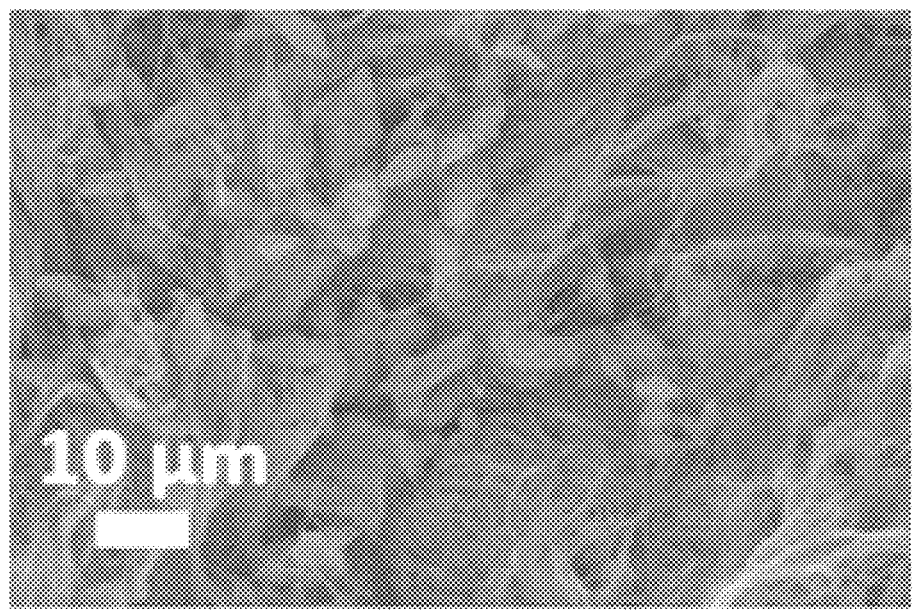
FIG. 5 shows an SEM image of Comparative Example 1 of a lithium-sulfur battery cathode material.

FIG. 5 illustrates an SEM image of Comparative Example 1 of the lithium-sulfur battery cathode material. FIG. 5 shows that the size of the sulfur nano-crystals as being in a microscale, and clustering of the sulfur particles is obvious.

The lithium-sulfur battery cathode material can be assembled to form a lithium-sulfur battery, and the performance of the lithium-sulfur battery can be tested. An anode can be a lithium foil; a separator can be a microporous polypropylene film (Celgard 2400); and the electrolyte can be lithium bistrifluoromethane sulfonamide (LiTFSI) dissolved in a concentration of about 1 mol/L in a mixed solvent containing dimethyl carbonate (DMC) and 1,3-Dioxolane (DOL) in a volume ratio of about 1:1, and 0.2 mol/L LiNO$_3$. In one embodiment, a cathode is the lithium-sulfur battery cathode material of Example 1. In another embodiment, the cathode is the lithium-sulfur battery cathode material of Comparative Example 1.

Figure 6:
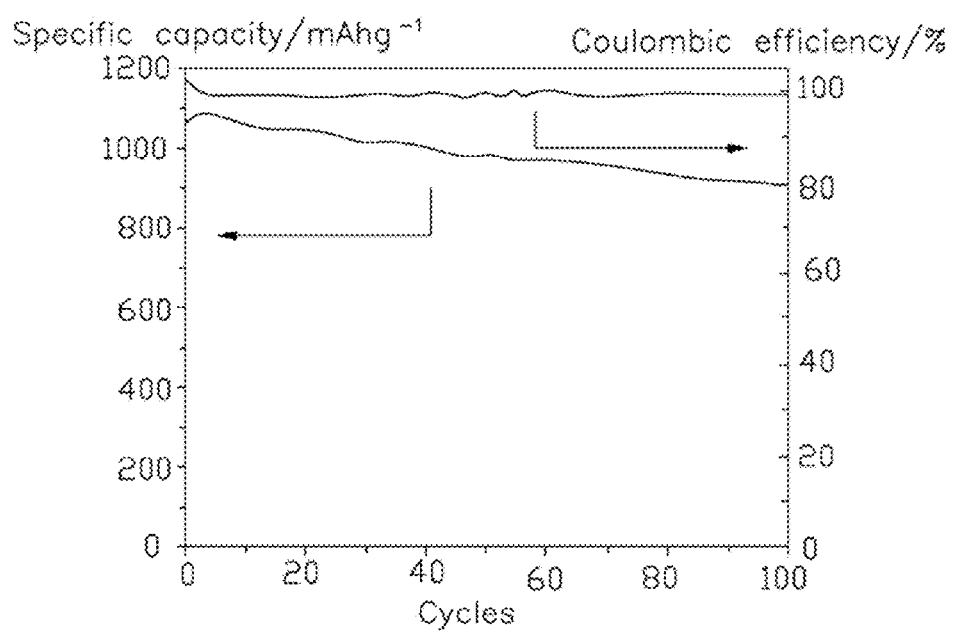
FIG. 6 shows specific capacity and coulombic efficiency curves with changes of cycles at a charge-discharge rate of about 1.0 C of Example 1 of the lithium-sulfur battery cathode material.

FIG. 6 shows that the initial discharge specific capacity of the lithium-sulfur battery cathode material of Example 1 is about 1088 mAh g$^{-1}$. After about 100 charge-discharge cycles, the discharge specific capacity of the lithium-sulfur battery cathode material of Example 1 is about 909 mAh g$^{-1}$, and has about 85% of the initial specific capacity remaining. Thus, the cycling stability of the lithium-sulfur battery cathode material of Example 1 is excellent. FIG. 6 also shows that a coulombic efficiency of the lithium-sulfur battery cathode material of Example 1 is about 100%.

Figure 7:
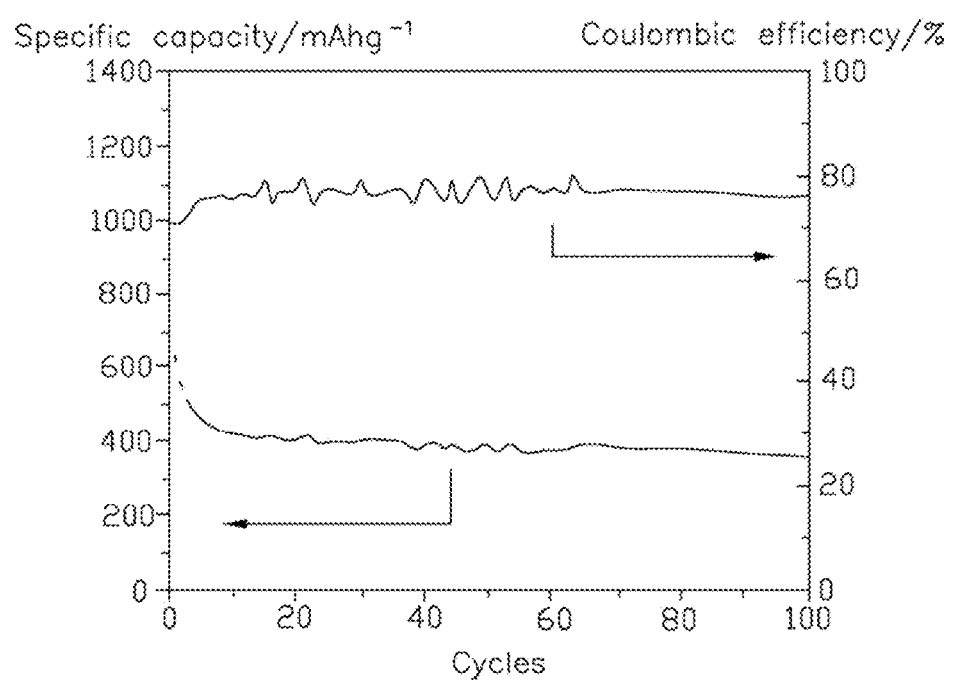
FIG. 7 shows specific capacity and coulombic efficiency curves with changes of cycles at a charge-discharge rate of about 1.0 C of Comparative Example 2 of the lithium-sulfur battery cathode material.

FIG. 7 shows that the initial discharge specific capacity of the lithium-sulfur battery cathode material of Comparative Example 2 is about 621 mAh g$^{-1}$. After about 100 charge-discharge cycles, the discharge specific capacity of the lithium-sulfur battery cathode material of Comparative Example 2 is about 400 mAh g$^{-1}$, and has about 65% of the initial capacities remaining FIG. 7 also shows that a coulombic efficiency of the lithium-sulfur battery cathode material of Comparative Example 2 is less than 80%.

Figure 8:
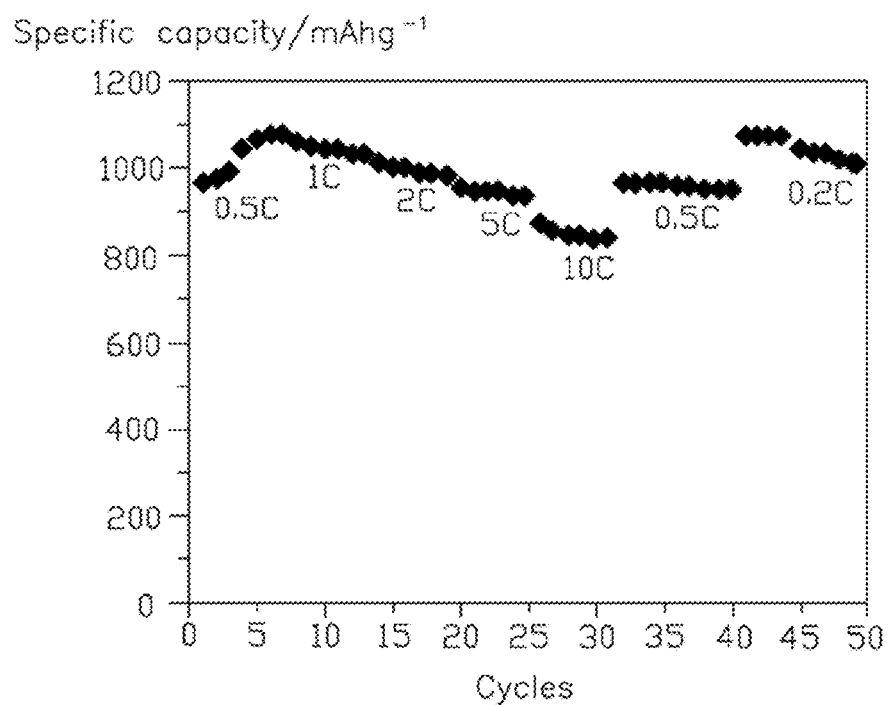
FIG. 8 shows specific capacity curves with changes of cycles at a discharge rate of about 0.5 C and different charge rates of Example 1 of the lithium-sulfur battery cathode material.

FIG. 8 shows that a charge-discharge performance of the lithium-sulfur battery cathode material of Example 1 at a high rate is excellent, and the lithium-sulfur battery cathode material of Example 1 can be used for fast charging-discharging.

Figure 9:
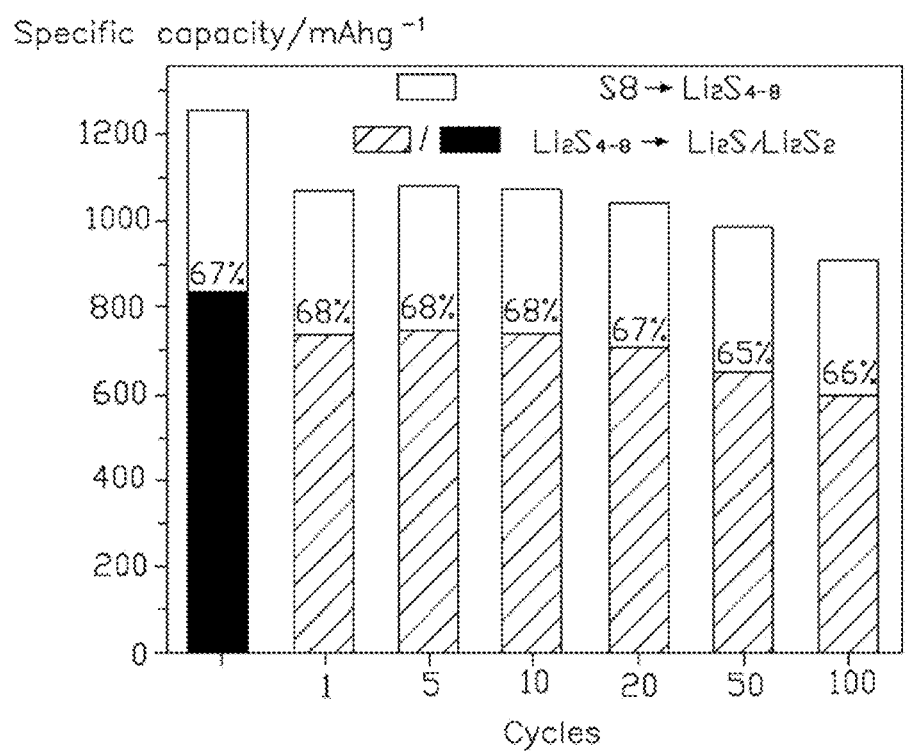
FIG. 9 shows a contribution rate histogram of a reaction from $Li_2S_{4-8}$ to $Li_2S_2/Li_2S$ to the specific capacity of lithium-sulfur battery cathode material with changes of cycles.

FIG. 9 shows that after about 100 charge-discharge cycles, a contribution rate of a reaction from $Li_2S_{4-8}$ to $Li_2S_2/Li_2S$ to the lithium-sulfur battery cathode material specific capacity is about 66%. Thus, the electrolyte can penetrate into the carbon nanotube net structure of the lithium-sulfur battery cathode material, to improve a utilization efficiency of sulfur/polysulphide. The sulfur/polysulphide can be held captive by the carbon nanotube net structure to prevent the loss of sulfur/polysulfide.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

What is claimed is:

1. A method for making a lithium-sulfur battery cathode material comprising:
   providing a carbon nanotube source;
   providing sulfur, and a first solvent, wherein the sulfur is soluble in the first solvent, the first solvent is methanol, ethanol, or acetone;
   adding the carbon nanotube source and the sulfur into the first solvent, and ultrasonically agitating the first solvent having the carbon nanotube source and the sulfur, to form a first suspension, wherein a concentration of the sulfur in the first solvent ranges from about 0.1 g/L to about 5 g/L;
   adding a second solvent into the first suspension during an agitation process to form a second suspension, wherein the sulfur is soluble in the second solvent, the first solvent and the second solvent is miscible; and
   removing the first solvent and the second solvent from the second suspension, to obtain the lithium-sulfur battery cathode material.

2. The method of claim 1, wherein a mass ratio of the sulfur and the carbon nanotube source is in a range from about 0.5:1 to about 2:1.

3. The method of claim 2, wherein the mass ratio of the sulfur and the carbon nanotube source is in a range from about 1:1 to about 1.5:1.

4. The method of claim 1, wherein during a process of ultrasonically agitating the first solvent having the carbon nanotube source and the sulfur, carbon nanotubes in the carbon nanotube source are flocculated to form a carbon nanotube net structure, and the sulfur is precipitated to form a plurality of sulfur nano-crystals.

5. The method of claim 4, wherein a mass ratio of the plurality of sulfur nano-crystals and the carbon nanotube net structure ranges from about 0.5:1 to about 2:1.

6. The method of claim 5, wherein the mass ratio of the plurality of sulfur nano-crystals and the carbon nanotube net structure ranges from about 1:1 to about 1.5:1.

7. The method of claim 1, wherein a volume ratio of the first solvent and the second solvent is in a range from about 1:1 to about 3:1.

8. The method of claim 1, wherein during a process of ultrasonically agitating the first solvent having the carbon nanotube source and the sulfur, a power of ultrasonic waves is in a range from about 800 W to about 1500 W.

9. The method of claim 1, wherein the concentration of the sulfur in the first solvent ranges from about 0.5 g/L to about 2 g/L.

10. The method of claim 1, wherein the second solvent is water.

11. The method of claim 1, wherein the step of providing the carbon nanotube source comprises: providing a carbon nanotube array on a substrate; and scratching off the carbon nanotube array from the substrate.

12. The method of claim 1, wherein the first solvent and the second solvent are removed from the second suspension via an air pump filtration method or a drying method.

* * * * *